(12) United States Patent
Yoshida et al.

(10) Patent No.: US 8,033,100 B2
(45) Date of Patent: Oct. 11, 2011

(54) EXHAUST PURIFICATION DEVICE OF COMPRESSION IGNITION TYPE INTERNAL COMBUSTION ENGINE

(75) Inventors: Kohei Yoshida, Gotenba (JP); Kotaro Hayashi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 899 days.

(21) Appl. No.: 11/990,387

(22) PCT Filed: Mar. 23, 2007

(86) PCT No.: PCT/JP2007/057003
§ 371 (c)(1),
(2), (4) Date: Feb. 13, 2008

(87) PCT Pub. No.: WO2007/111372
PCT Pub. Date: Oct. 4, 2007

(65) Prior Publication Data
US 2009/0249767 A1    Oct. 8, 2009

(30) Foreign Application Priority Data

Mar. 23, 2006  (JP) ................................ 2006-080981

(51) Int. Cl.
*F01N 3/10* (2006.01)
(52) U.S. Cl. ................ 60/286; 60/299; 60/301

(58) Field of Classification Search ............... 60/285, 60/76, 295, 297, 300, 303
See application file for complete search history.

(56) References Cited

U.S. PATENT DOCUMENTS

| 5,473,890 A | 12/1995 | Takeshima et al. |
| 2004/0040291 A1 | 3/2004 | Toshioka et al. |
| 2005/0170954 A1 | 8/2005 | Yoshida et al. |

FOREIGN PATENT DOCUMENTS

| JP | A-6-336914 | 12/1994 |
| JP | A-11-257051 | 9/1999 |
| JP | A-2000-274230 | 10/2000 |
| JP | A-2000-303878 | 10/2000 |
| JP | A-2004-92524 | 3/2004 |
| JP | A-2005-211862 | 8/2005 |
| WO | WO 2005040571 A1 * | 5/2005 |

* cited by examiner

*Primary Examiner* — Thomas Denion
*Assistant Examiner* — Patrick Maines
(74) *Attorney, Agent, or Firm* — Oliff & Berridge, PLC

(57) ABSTRACT

An internal combustion engine wherein an $SO_X$ trap catalyst (11) able to trap $SO_X$ contained in exhaust gas is arranged in an engine exhaust passage upstream of an $NO_X$ storing catalyst (12). When the air-fuel ratio of the exhaust gas flowing into the $SO_X$ trap catalyst (11) is switched from lean to rich to make the $NO_X$ storing catalyst (12) release the $NO_X$, if the temperature of the $SO_X$ trap catalyst (11) is the $SO_X$ release lower limit temperature or more, rich processing making the air-fuel ratio of the exhaust gas flowing into the $SO_X$ trap catalyst (11) rich for making the $NO_X$ storing catalyst (12) release $NO_X$ is prohibited.

15 Claims, 15 Drawing Sheets

Fig.3
(A)
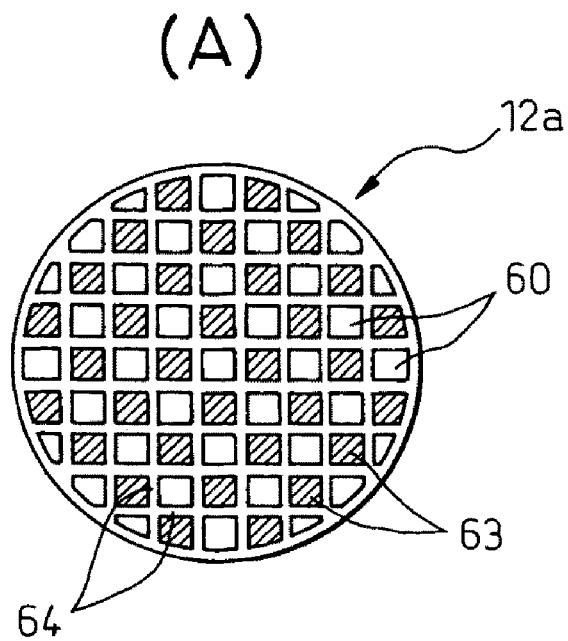
(B)
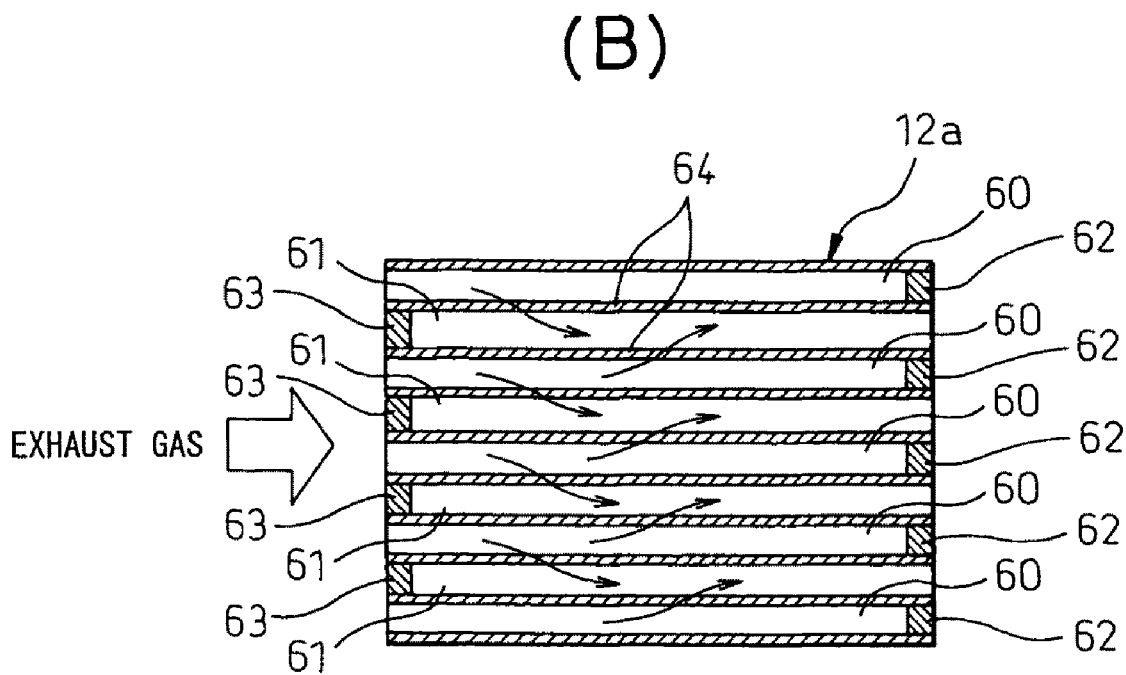
EXHAUST GAS

Fig. 8
(A)
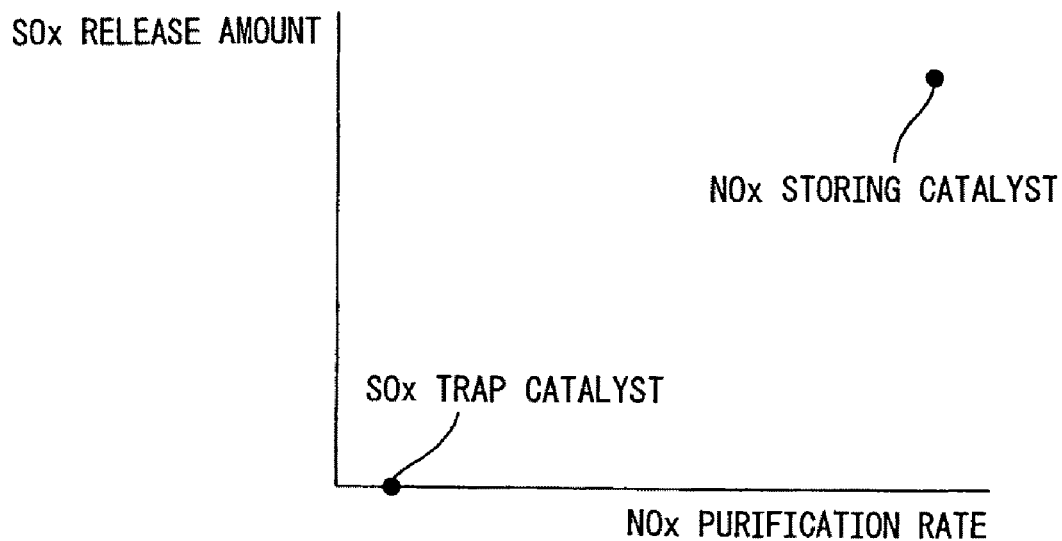
(B)
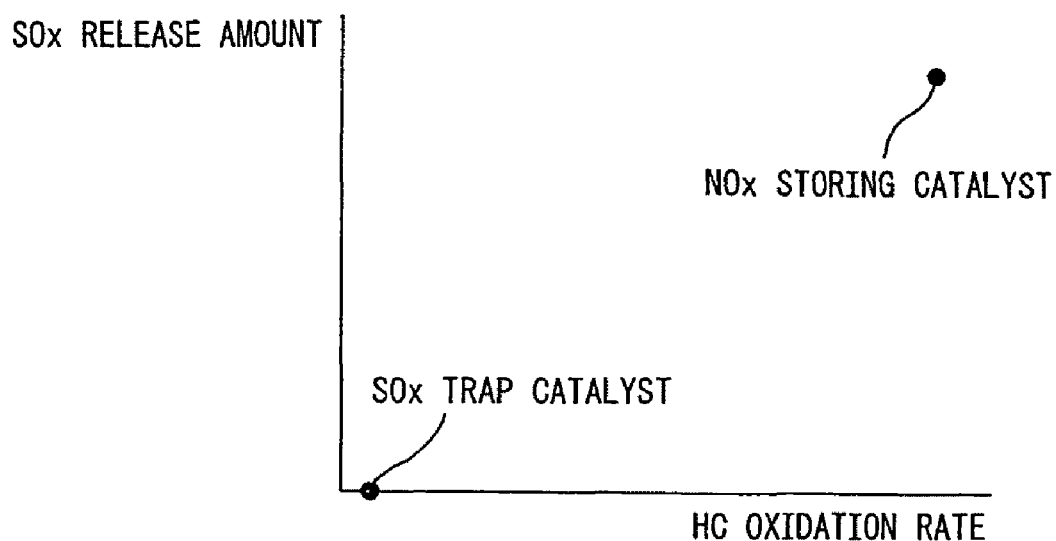

Fig.10
(A)
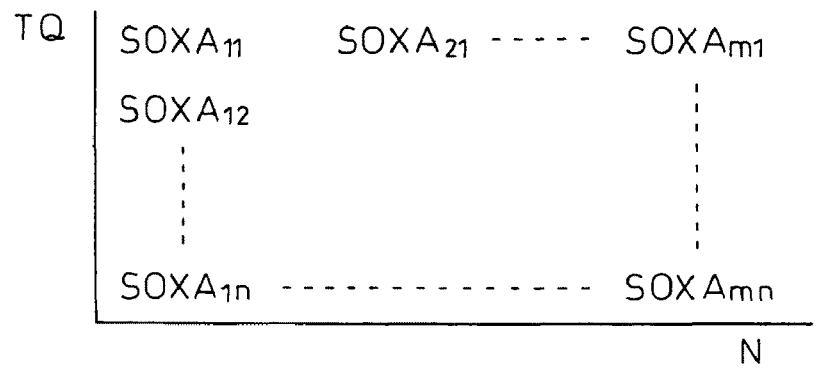
(B)
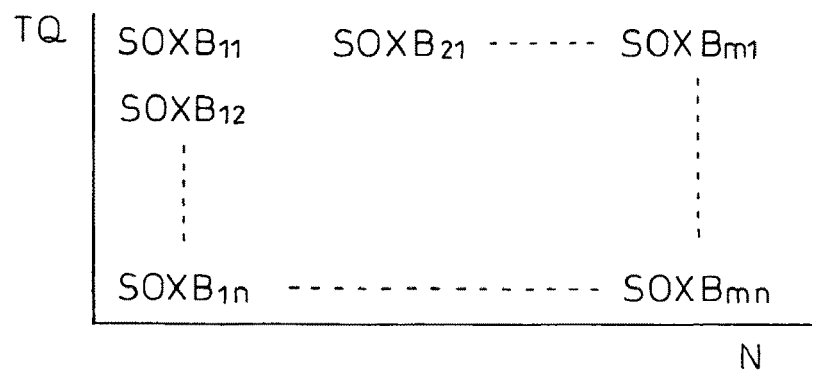
(C)
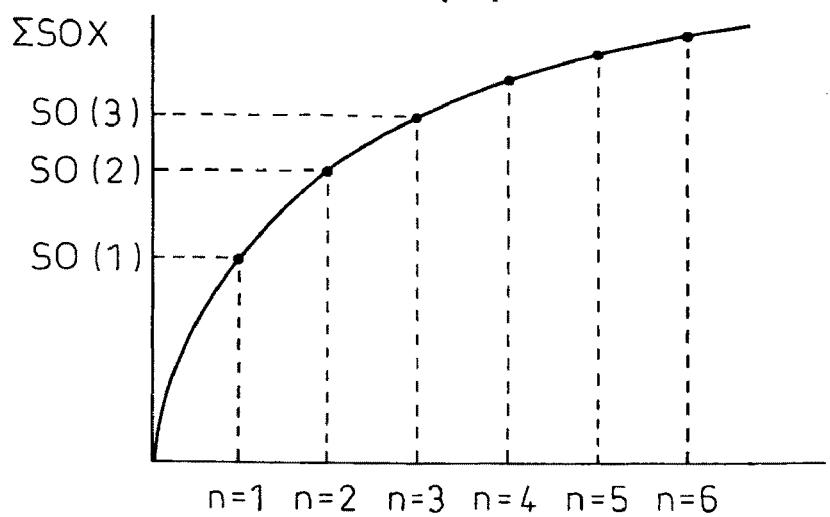

EXHAUST PURIFICATION DEVICE OF COMPRESSION IGNITION TYPE INTERNAL COMBUSTION ENGINE

TECHNICAL FIELD

The present invention relates to an exhaust purification device of a compression ignition type internal combustion engine.

BACKGROUND ART

Known in the art is an internal combustion engine arranging in an engine exhaust passage an $NO_X$ storing catalyst storing $NO_X$ contained in exhaust gas when the air-fuel ratio of the inflowing exhaust gas is lean and releasing the stored $NO_X$ when the air-fuel ratio of the inflowing exhaust gas becomes the stoichiometric air-fuel ratio or rich. In this internal combustion engine, the $NO_X$ generated when burning fuel under a lean air-fuel ratio is stored in the $NO_X$ storing catalyst. On the other hand, if the $NO_X$ storing capability of the $NO_X$ storing catalyst approaches saturation, the air-fuel ratio of the exhaust gas is temporarily made rich and thereby $NO_X$ is released from the $NO_X$ storing catalyst and reduced.

However, fuel and lubrication oil contain sulfur, therefore the exhaust gas contains $SO_X$. This $SO_X$ is stored together with the $NO_X$ in the $NO_X$ storing catalyst. However, this $SO_X$ is not released from the $NO_X$ storing catalyst by just making the air-fuel ratio of the exhaust gas rich, therefore the amount of $SO_X$ stored in the $NO_X$ storing catalyst gradually increases. As a result, the amount of $NO_X$ which can be stored ends up gradually decreasing.

Therefore, to prevent $SO_X$ from being sent to the $NO_X$ storing catalyst, an internal combustion engine provided with an $SO_X$ trap agent in the engine exhaust passage upstream of the $NO_X$ storing catalyst is known (see Japanese Patent Publication (A) No. 2004-92524). In this internal combustion engine, the $SO_X$ contained in the exhaust gas is trapped by the $SO_X$ trap agent, therefore the flow of $SO_X$ into the $NO_X$ storing catalyst is inhibited. As a result, it is possible to prevent the storing capability of $NO_X$ from falling due to the storage of $SO_X$.

However, in this internal combustion engine, before the $SO_X$ trap capability of the $SO_X$ trap agent becomes saturated, $SO_X$ is released from the $SO_X$ trap agent. In this case, to ensure that the $SO_X$ is released well from the $SO_X$ trap agent, it is necessary to make the air-fuel ratio of the exhaust gas rich when the temperature of the $SO_X$ trap agent is the $SO_X$ release temperature. Therefore, in this internal combustion engine, to ensure that $SO_X$ be released from the $SO_X$ trap agent, the air-fuel ratio of the exhaust gas is made rich when the temperature of the $SO_X$ trap agent is the $SO_X$ release temperature.

Further, this internal combustion engine is provided with a bypass exhaust passage bypassing the $NO_X$ storing catalyst for preventing the $SO_X$ released from the $SO_X$ trap agent from flowing into the $NO_X$ storing catalyst. When $SO_X$ trap agent has released $SO_X$, the exhaust gas flowing out from the $SO_X$ trap agent is guided into the bypass exhaust passage.

On the other hand, in this internal combustion engine, when the $SO_X$ trap amount of the $SO_X$ trap agent becomes a fixed amount or more, when the air-fuel ratio of the exhaust gas is made rich to release $NO_X$ from the $NO_X$ storing catalyst, even if the temperature of the $SO_X$ trap agent is made the $SO_X$ release temperature or less, $SO_X$ is released from the $SO_X$ trap agent, therefore the $SO_X$ ends up being stored in the $NO_X$ storing catalyst. Therefore, in this internal combustion engine, when the $SO_X$ trap amount of the $SO_X$ trap agent becomes a fixed amount or more, the air-fuel ratio of the exhaust gas is prohibited from being made rich.

However, in this case, if using an $SO_X$ trap agent not releasing $SO_X$ when the air-fuel ratio of the exhaust gas is made rich to release $NO_X$ from the $NO_X$ storing catalyst, $SO_X$ will no longer be stored in the $NO_X$ storing catalyst. Further, at any time when the $NO_X$ storing catalyst should release $NO_X$, the air-fuel ratio of the exhaust gas can be made rich. However, so long as the $SO_X$ trap agent is given the function of releasing $SO_X$ like with this internal combustion engine, it is difficult to prevent $SO_X$ from being released when the air-fuel ratio of the exhaust gas becomes rich.

As opposed to this, if not giving the $SO_X$ trap catalyst the function of releasing $SO_X$ and only giving it the function of storing $SO_X$, even if making the air-fuel ratio of the exhaust gas rich so as to make the $NO_X$ storing catalyst release $NO_X$, usually $SO_X$ is not released from the $SO_X$ trap catalyst, therefore $SO_X$ is no longer stored in the $NO_X$ storing catalyst. However, the problem arises that even when using such an $SO_X$ trap catalyst, if the temperature of the $SO_X$ trap catalyst becomes the $SO_X$ release lower limit temperature or more, $SO_X$ will be released from the $SO_X$ trap catalyst when the air-fuel ratio of the exhaust gas is made rich so as to release $NO_X$ from the $NO_X$ storing catalyst.

DISCLOSURE OF THE INVENTION

The present invention provides an exhaust purification device of a compression ignition type internal combustion engine which can make an $NO_X$ storing catalyst release $NO_X$ without making an $SO_x$ trap catalyst release $SO_x$.

According to the present invention, there is provided an exhaust purification device of a compression ignition type internal combustion engine arranging in an engine exhaust passage an $SO_X$ trap catalyst able to trap $SO_X$ contained in exhaust gas and arranging in the exhaust passage downstream of the $SO_X$ trap catalyst an $NO_X$ storing catalyst storing $NO_X$ contained in the exhaust gas when the air-fuel ratio of an inflowing exhaust gas is lean and releasing stored $NO_X$ when the air-fuel ratio of the inflowing exhaust gas becomes the stoichiometric air-fuel ratio or rich, wherein when the air-fuel ratio of the exhaust gas flowing into the $SO_X$ trap catalyst is switched from lean to rich so as to make the $NO_X$ storing catalyst release $NO_X$, if the temperature of the $SO_X$ trap catalyst is higher than a $SO_X$ release lower limit temperature for releasing $SO_X$, rich processing making the air-fuel ratio of the exhaust gas flowing into the $SO_X$ trap catalyst to make the $NO_X$ storing catalyst release $NO_X$ is prohibited.

BRIEF DESCRIPTION OF THE DRAWINGS

FIG. 3 is a view showing the structure of a particulate filter, FIG. 8 is a view showing the relationship between the $NO_X$ purification rate and $SO_X$ release amount etc., FIG. 10 is a view showing the relationship between the stored $SO_X$ amount $\Sigma SOX$ and the stored $SO_X$ amount $SO(n)$ for temperature raising control etc.

BEST MODE FOR CARRYING OUT THE INVENTION

Figure 1:
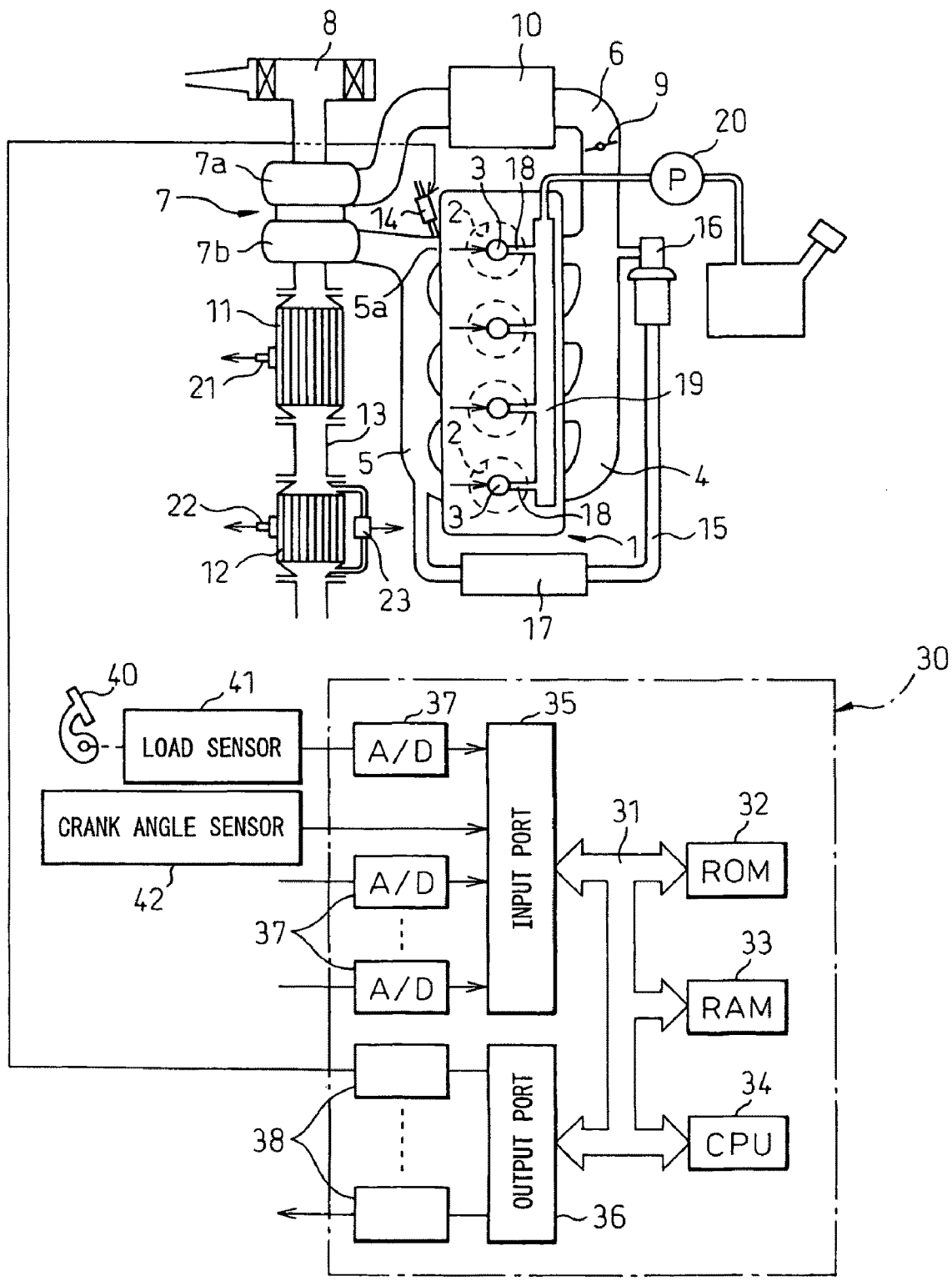
FIG. 1 is an overview of a compression ignition type internal combustion engine.

FIG. 1 shows an overview of a compression ignition type internal combustion engine.

Referring to FIG. 1, 1 shows an engine body, 2 a combustion chamber of each cylinder, 3 an electronic control type fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected to an air cleaner 8. Inside the intake duct 6 is arranged a throttle valve 9 driven by a step motor. Further, around the intake duct 6 is arranged a cooling device 10 for cooling the intake air flowing inside the intake duct 6. In the embodiment shown in FIG. 1, the engine cooling water is guided into the cooling device 10 where the engine cooling water is used to cool the intake air.

On the other hand, the exhaust manifold 5 is connected to the inlet of the exhaust turbine 7b of the exhaust turbocharger 7, while the outlet of the exhaust turbine 7b is connected to an inlet of the $SO_X$ trap catalyst 11. Further, the outlet of the $SO_X$ trap catalyst 11 is connected through an exhaust pipe 13 to an $NO_X$ storing catalyst 12. As shown in FIG. 1, inside a manifold tube 5a of for example a No. 1 cylinder of the exhaust manifold 5, for example a reducing agent feed valve 14 is provided for feeding a reducing agent comprised of a hydrocarbon.

The exhaust manifold 5 and the intake manifold 4 are connected with each other through an exhaust gas recirculation (hereinafter referred to as an "EGR") passage 15. Inside the EGR passage 15, an electrical control type EGR control valve 16 is arranged. Further, around the EGR passage 15, a cooling device 17 is arranged for cooling the EGR gas flowing through the inside of the EGR passage 15. In the embodiment shown in FIG. 1, engine cooling water is guided into the cooling device 17 where the engine cooling water is used to cool the EGR gas. On the other hand, the fuel injectors 3 are connected through fuel feed pipes 18 to a common rail 19. This common rail 19 is supplied with fuel from an electronic control type variable discharge fuel pump 20. The fuel supplied into the common rail 19 is supplied through the fuel feed pipes 18 to the fuel injectors 3.

The electronic control unit 30 is comprised of a digital computer and is provided with a ROM (read only memory) 32, RAM (random access memory) 33, CPU (microprocessor) 34, input port 35, and output port 36 connected with each other by a bi-directional bus 31. The $SO_X$ trap catalyst 11 has a temperature sensor 21 detecting the temperature of the $SO_X$ trap catalyst 11 attached to it. The $NO_X$ storing catalyst 12 has a temperature sensor 22 for detecting the temperature of the $NO_X$ storing catalyst 12 attached to it. The output signals of these temperature sensors 21 and 22 are input through corresponding AD converters 37 to the input port 35. Further, the $NO_X$ storing catalyst 12 has a differential pressure sensor 23 for detecting the differential pressure before and after the $NO_X$ storing catalyst 12 attached to it. The output signal of this differential pressure sensor 23 is input through the corresponding AD converter 37 to the input port 35.

The accelerator pedal 40 has connected to it a load sensor 41 generating an output voltage proportional to the amount of depression L of the accelerator pedal 40. The output voltage of the load sensor 41 is input through the corresponding AD converter 37 to the input port 35. Further, the input port 35 has a crank angle sensor 42 connected to it generating an output pulse each time the crankshaft rotates by for example 15°. On the other hand, the output port 36 is connected through the corresponding drive circuits 38 to the fuel injectors 3, throttle valve 9 drive step motor, reducing agent feed valve 14, EGR control valve 16, and fuel pump 20.

Figure 2:
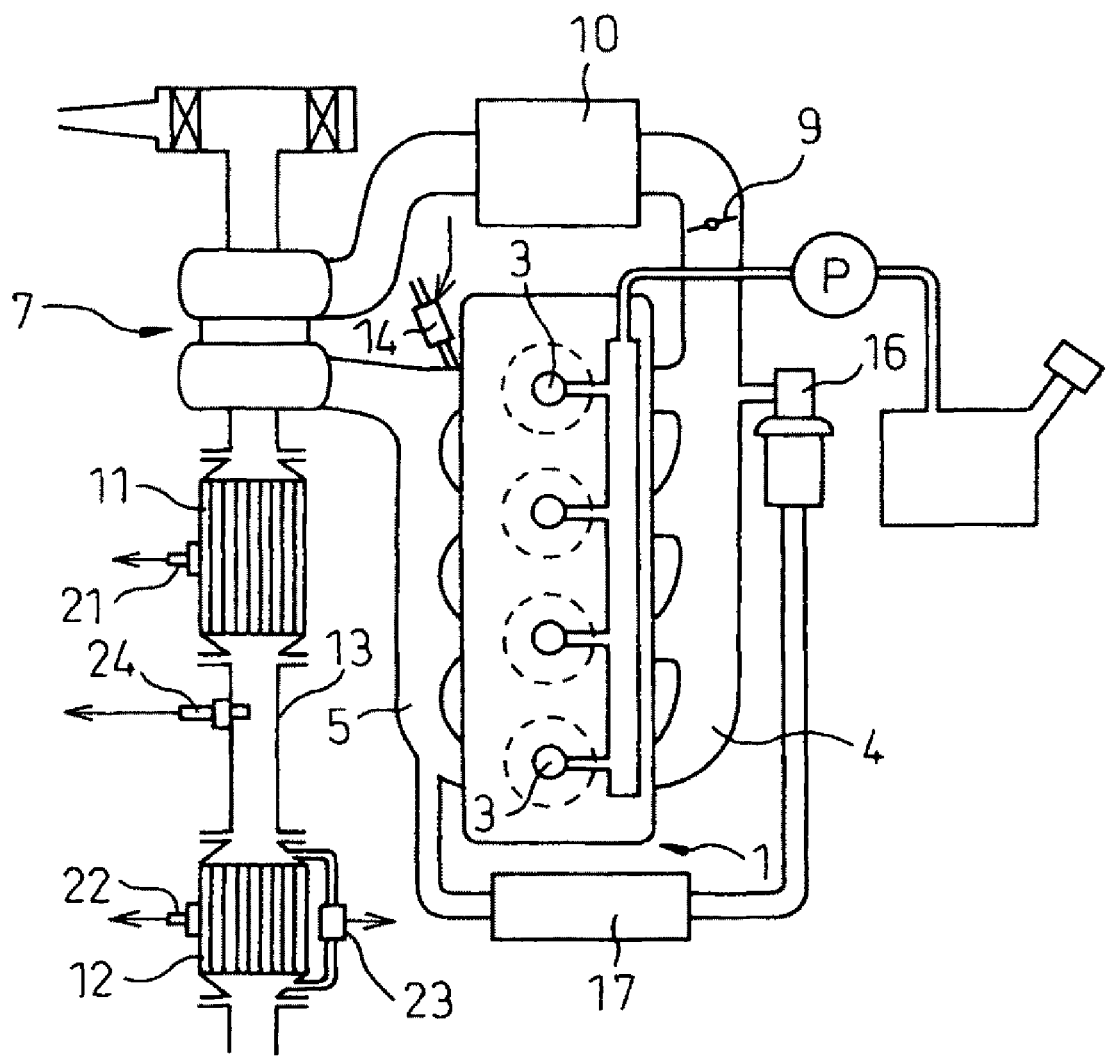
FIG. 2 is an overview of another embodiment of a compression ignition type internal combustion engine.

FIG. 2 shows another embodiment of a compression ignition type internal combustion engine. In this embodiment, in the exhaust pipe 13, a $SO_X$ sensor 24 is arranged for detecting the $SO_X$ concentration in the exhaust gas flowing out from the $SO_X$ trap catalyst 11.

First, explaining the $NO_X$ storing catalyst 12 shown in FIG. 1 and FIG. 2, the $NO_X$ storing catalyst 12 is carried on a three dimensional mesh structure monolith carrier or a pellet-shaped carrier or is carried on a particulate filter forming a honeycomb structure. In this way, the $NO_X$ storing catalyst 12 can be carried on various carriers, but below the case of carrying the $NO_X$ storing catalyst 12 on a particulate filter will be explained.

FIGS. 3(A) and (B) show the structure of a particulate filter 12a carrying the $NO_X$ storing catalyst 12. Note that FIG. 3(A) shows a front view of the particulate filter 12a, while FIG. 3(B) shows a side sectional view of the particulate filter 12a. As shown in FIGS. 3(A) and (B), the particulate filter 12a forms a honeycomb structure and is provided with a plurality of exhaust flow passages 60, 61 extending in parallel with each other. These exhaust flow passages are comprised of exhaust gas inflow passages 60 with downstream ends closed by plugs 62 and exhaust gas outflow passages 61 with upstream ends closed by plugs 63. Note that the hatched parts in FIG. 3(A) show the plugs 63. Therefore, the exhaust gas inflow passages 60 and exhaust gas outflow passages 61 are alternately arranged via thin partition walls 64. In other words, the exhaust gas inflow passages 60 and exhaust gas outflow passages 61 are arranged so that each exhaust gas inflow passage 60 is surrounded by four exhaust gas outflow passages 61 and each exhaust gas outflow passage 61 is surrounded by four exhaust gas inflow passages 60.

The particulate filter 12a is for example formed from a porous material such as cordierite. Therefore, the exhaust gas flowing into the exhaust gas inflow passage 60, as shown by the arrows in FIG. 3(B), passes through the surrounding partition walls 64 and flows out into the adjoining exhaust gas outflow passages 61.

Figure 4:
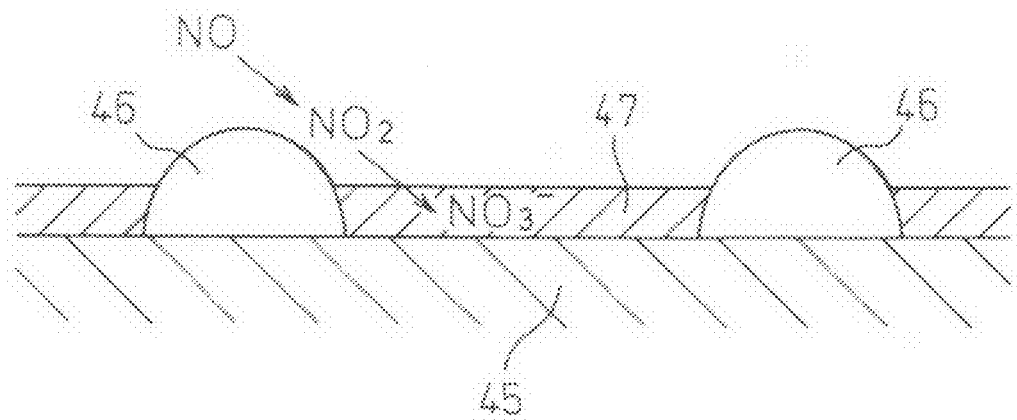
FIG. 4 is a sectional view of a surface part of a catalyst carrier of an $NO_X$ storing catalyst.

When carrying the $NO_X$ storing catalyst 12 on the particulate filter 12a in this way, the peripheral walls of the exhaust gas inflow passages 60 and exhaust gas outflow passages 61, that is, the two side surfaces of the partition walls 64 and the inside walls of the fine holes in the partition walls 64, carry, for example, a catalyst carrier comprised of alumina. FIG. 4 schematically shows a section of the surface part of this catalyst carrier 45. As shown in FIG. 4, on the surface of the catalyst carrier 45, a precious metal catalyst 46 is carried diffused in it. Further, on the surface of the catalyst carrier 45, a layer of an $NO_X$ absorbent 47 is formed.

In the embodiment according to the present invention, as the precious metal catalyst 46, platinum Pt is used. As the ingredient forming the $NO_X$ absorbent 47, for example, at least one ingredient selected from potassium K, sodium Na, cesium Cs, or another such alkali metal, barium Ba, calcium Ca, or another such alkali earth, and lanthanum La, yttrium Y, or another such rare earth is used.

If the ratio of the air and fuel (hydrocarbons) supplied inside the engine intake passage, combustion chambers 2, and exhaust passage upstream of the $NO_X$ storing catalyst 12 is referred to as the "air-fuel ratio of the exhaust gas", $NO_X$ absorption and release action such that the $NO_X$ absorbent 47 absorbs the $NO_X$ when the air-fuel ratio of the exhaust gas is lean and releases the absorbed $NO_X$ when the oxygen concentration in the exhaust gas falls is carried out.

That is, explaining the case of using barium Ba as the ingredient forming the $NO_X$ absorbent 47 as an example, when the air-fuel ratio of the exhaust gas is lean, that is, when the oxygen concentration in the exhaust gas is high, the NO contained in the exhaust gas, as shown in FIG. 4, is oxidized on the platinum Pt 46 and becomes $NO_2$, next this is absorbed in the $NO_X$ absorbent 47 and, while bonding with the barium oxide BaO, diffuses in the form of nitric acid ions $NO_3^-$ inside the $NO_X$ absorbent 47. In this way, the $NO_X$ is absorbed inside the $NO_X$ absorbent 47. So long as the oxygen concentration in the exhaust gas is high, $NO_2$ is produced on the surface of the platinum Pt 46. So long as the $NO_X$ absorption capability of the $NO_X$ absorbent 47 is not saturated, the $NO_2$ is absorbed in the $NO_X$ absorbent 47 and nitric acid ions $NO_3^-$ are produced.

As opposed to this, if having the reducing agent feed valve 14 feed reducing agent to make the air-fuel ratio of the exhaust gas rich or the stoichiometric air-fuel ratio, the oxygen concentration in the exhaust gas falls, so the reaction proceeds in the opposite direction ($NO_3^- \rightarrow NO_2$) and therefore the nitric acid ions $NO_3^-$ in the $NO_X$ absorbent 47 are released in the form of $NO_2$ from the $NO_X$ absorbent 47. Next, the released $NO_X$ is reduced by the unburned HC and CO contained in the exhaust gas.

In this way, when the air-fuel ratio of the exhaust gas is lean, that is, when combustion is performed under a lean air-fuel ratio, the $NO_X$ in the exhaust gas is absorbed in the $NO_X$ absorbent 47. However, when combustion continues under a lean air-fuel ratio, during that time the $NO_X$ absorption capability of the $NO_X$ absorbent 47 ends up becoming saturated and therefore the $NO_X$ absorbent 47 ends up no longer being able to absorb the $NO_X$. Therefore, in the embodiment according to the present invention, before the absorption capability of the $NO_X$ absorbent 47 becomes saturated, reducing agent is supplied from the reducing agent feed valve 14 so as to temporarily make the air-fuel ratio of the exhaust gas rich and thereby make the $NO_X$ be released from the $NO_X$ absorbent 47.

However, exhaust gas contains $SO_X$, that is, $SO_2$. When this $SO_2$ flows into the $NO_X$ storing catalyst 12, this $SO_2$ is oxidized at the platinum Pt 46 and becomes $SO_3$. Next, this $SO_3$ is absorbed in the $NO_X$ absorbent 47, bonds with the barium oxide BaO, and is diffused in the form of sulfuric acid ions $SO_4^{2-}$ inside the $NO_X$ absorbent 47 to generate the sulfate $BaSO_4$. If the sulfate $BaSO_4$ increases, the amount of absorption of $NO_X$ is decreased and therefore the amount of $NO_X$ which the $NO_X$ adsorbent 47 can absorb falls along with the elapse of time.

Therefore, in the present invention, an $SO_X$ trap catalyst 11 is arranged upstream of the $NO_X$ storing catalyst 12. This $SO_X$ trap catalyst 11 is used to trap the $SO_X$ contained in the exhaust gas, whereby $SO_X$ is prevented from flowing into the $NO_X$ storing catalyst 12. Next, this $SO_X$ trap catalyst 11 will be explained.

Figure 5:
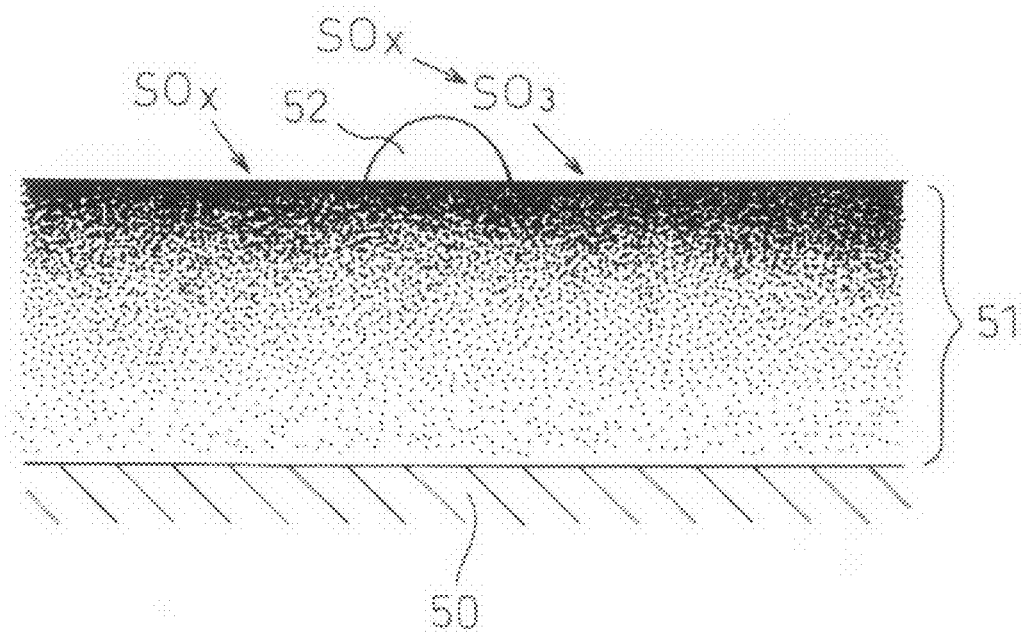
FIG. 5 is a sectional view of a surface part of a catalyst carrier of an $SO_X$ trap catalyst.

This $SO_X$ trap catalyst 11 is comprised of for example a honeycomb structure monolith catalyst and has a large number of exhaust gas flow holes extending straight in the axial direction of the $SO_X$ trap catalyst 11. When forming the $SO_X$ trap catalyst 11 from a honeycomb structure monolith catalyst in this way, the inner peripheral walls of the exhaust gas flow holes carry for example a catalyst carrier comprised of alumina. FIG. 5 schematically shows the section of the surface part of this catalyst carrier 50. As shown in FIG. 5, on the surface of the catalyst carrier 50, a coat layer 51 is formed. On the surface of this coat layer 51, a precious metal catalyst 52 is carried diffused in it.

In the embodiment according to the present invention, as the precious metal catalyst 52, platinum Pt is used. As the ingredient forming the coat layer 51, for example, at least one ingredient selected from potassium K, sodium Na, cesium Cs, or another such alkali metal, barium Ba, calcium Ca, or another such alkali earth, and lanthanum La, yttrium Y, or another such rare earth is used. That is, the coat layer 51 of the $SO_X$ trap catalyst 11 exhibits a strong basicity.

Now, the $SO_X$ contained in the exhaust gas, that is, the $SO_2$, is oxidized at the platinum Pt 52 as shown in FIG. 5, then is trapped in the coat layer 51. That is, $SO_2$ diffuses in the coat layer in the form of sulfuric acid ions $SO_4^{2-}$ and forms a sulfate. Note that, as explained above, the coat layer 51 exhibits a strong basicity. Therefore, as shown in FIG. 5, part of the $SO_2$ contained in the exhaust gas is directly trapped in the coat layer 51.

In FIG. 5, the concentration in the coat layer 51 shows the concentration of trapped $SO_X$. As will be understood from FIG. 5, the $SO_X$ concentration in the coat layer 51 is highest near the surface of the coat layer 51 and gradually falls the further inside. If the $SO_X$ concentration near the surface of the coat layer 51 becomes higher, the basicity of the surface of the coat layer 51 becomes weaker and the trapping capability of $SO_X$ is weakened. Here, if the ratio of the $SO_X$ trapped by the $SO_X$ trap catalyst 11 to the $SO_X$ contained in the exhaust gas is called the $SO_X$ trap rate, if the basicity of the surface of the coat layer 51 weakens, the $SO_X$ trap rate will fall along with that.

Figure 6:
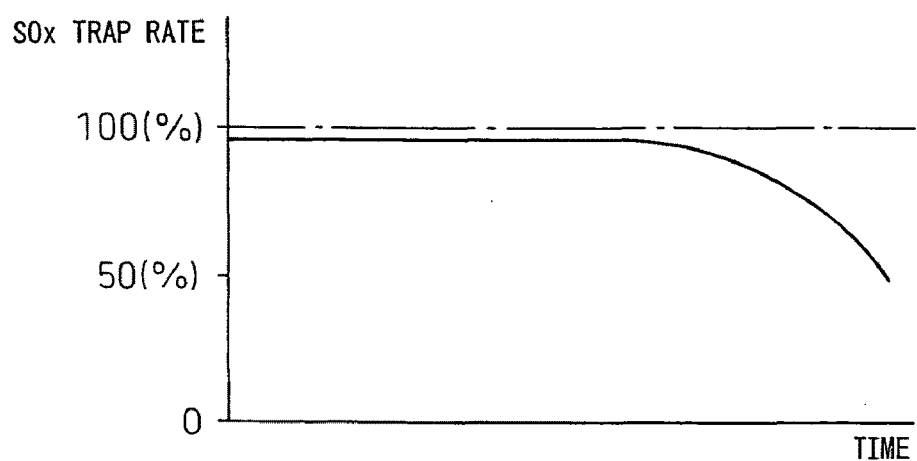
FIG. 6 is a view showing an $SO_X$ trap rate.
Figure 7:
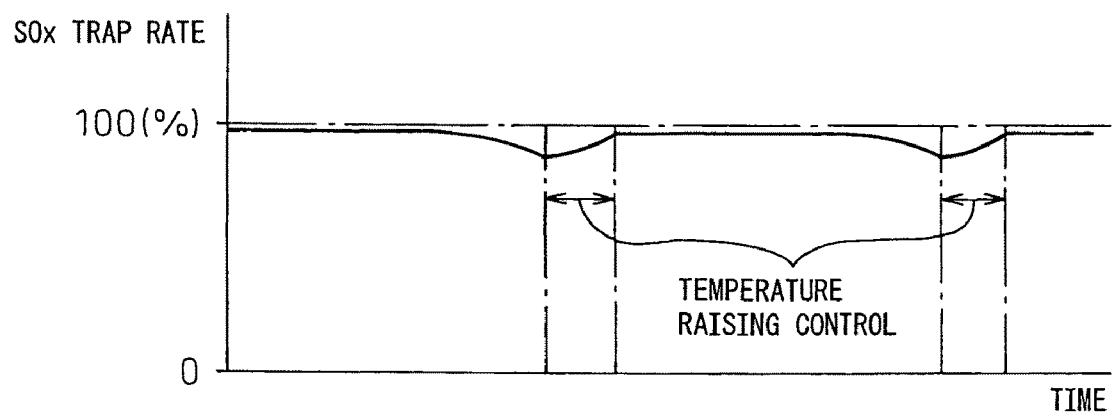
FIG. 7 is a view for explaining a temperature raising control.

FIG. 6 shows the changes in the $SO_X$ trap rate along with time. As shown in FIG. 6, the $SO_X$ trap rate is first close to 100 percent, but as time elapses, the $SO_X$ trap rate rapidly falls. Therefore, in the present invention, as shown in FIG. 7, when the $SO_X$ trap rate falls below a predetermined rate, temperature raising control is performed for raising the temperature of the $SO_X$ trap catalyst 11 under a lean air-fuel ratio of the exhaust gas and thereby the $SO_X$ trap rate is restored.

That is, if raising the temperature of the $SO_X$ trap catalyst 11 under a lean air-fuel ratio of the exhaust gas, the $SO_X$ concentrated present near the surface in the coat layer 51 diffuses to the inside of the coat layer 51 so that the $SO_X$ concentration in the coat layer 51 becomes uniform. That is, the nitrates formed in the coat layer 51 change from the instable state where they concentrate near the surface of the coat layer 51 to a stable state where they are uniformly diffused throughout the entire coat layer 51. If the $SO_X$ present near the surface in the coat layer 51 diffuses toward the inside of the coat layer 51, the concentration of $SO_X$ near the surface of the coat layer 51 falls and therefore when the temperature raising control of the $SO_X$ trap catalyst 11 ends, as shown in FIG. 7, the $SO_X$ trap rate is restored.

When performing temperature raising control of the $SO_X$ trap catalyst 11, if making the temperature of the $SO_X$ trap catalyst 11 about 450° C., the $SO_X$ near the surface of the coat layer 51 can be made to diffuse inside the coat layer 51. If raising the temperature of the $SO_X$ trap catalyst 11 to 600° C. or so, the concentration of $SO_X$ inside the coat layer 51 can be made considerably uniform. Therefore, at the time of temperature raising control of the $SO_X$ trap catalyst 11, it is preferable to raise the temperature of the $SO_X$ trap catalyst 11 to 600° C. or so under a lean air-fuel ratio of the exhaust gas.

Now, as explained above, in the embodiment according to the present invention, before the absorption capability of the $NO_X$ absorbent 47 becomes saturated, the reducing agent feed valve 14 is made to supply reducing agent so as to temporarily make the air-fuel ratio of the exhaust gas rich and thereby make the $NO_X$ absorbent 47 release the $NO_X$. Therefore, at this time, the air-fuel ratio of the exhaust gas flowing into the $SO_X$ trap catalyst 11 becomes temporarily rich. However, at this time, if the $SO_X$ trap catalyst 11 releases $SO_X$, this $SO_X$ is absorbed in the $NO_X$ storing catalyst 12. Therefore, in the present invention, the $SO_X$ trap catalyst 11 is formed so that at this time, the $SO_X$ trap catalyst 11 does not release $SO_X$.

That is, if making the basicity of the $SO_X$ trap catalyst 11 stronger, the trapped $NO_X$ becomes harder to release. Therefore, to prevent $SO_X$ from being released, it is preferable to make the basicity of the $SO_X$ trap catalyst 11 stronger. Further, the phenomenon of $SO_X$ release is the phenomenon of reduction and release of the oxidized and absorbed $SO_X$, therefore to prevent the $SO_X$ from being released, the $SO_X$ has to be prevented from being reduced. In this case, the $SO_X$ reduction action is performed by the reducing agent supplied from the reducing agent feed valve 14, that is, the HC, so to prevent the $SO_X$ from being released, the reduction function of the $NO_X$ by the HC, that is, the oxidation function of the HC by the $NO_X$, has to be weakened.

Note that the $SO_X$ trapping action is performed by the coat layer 51, therefore to prevent $SO_X$ from being released, the basicity of the coat layer 51 has to be made stronger. Further, the $SO_X$ reduction action is performed by the precious metal catalyst 46, therefore to prevent $SO_X$ from being released, the $SO_X$ reduction action by the precious metal catalyst 46, that is, the HC oxidation action, has to be weakened. In this case, if making the basicity of the coat layer 51 stronger, the oxidation action of the HC by the precious metal catalyst 46, that is, the acidity, is weakened.

Therefore, in the present invention, the basicity of the coat layer 51, that is, the basicity of the $SO_X$ trap catalyst 11, is strengthened and the acidity is weakened so that $SO_X$ is not released. In this case, it is difficult to quantitatively express to what extent to strengthen the basicity of the $SO_X$ trap catalyst 11 and to what extent to weaken the acidity, but it is possible to express to what extent to strengthen the basicity and to what extent to weaken the acidity by using the $NO_X$ purification rate or HC oxidation rate compared with the $NO_X$ storing catalyst 12. Next, this will be explained while referring to FIG. 8.

FIG. 8(A) shows the relationship between the $NO_X$ purification rate and $SO_X$ release rate of the $SO_X$ trap catalyst 11 and the $NO_X$ storing catalyst 12 used in the present invention, while FIG. 8(B) shows the relationship between the HC oxidation rate and $SO_X$ release rate of the $SO_X$ trap catalyst 11 and $NO_X$ storing catalyst 12 used in the present invention. Note that the relationships shown in FIG. 8(A) and FIG. 8(B) are those at the time when the temperature of the $SO_X$ trap catalyst 11 is in the temperature range at the time of ordinary operation, that is, between about 150° C. to about 400° C. The $NO_X$ storing catalyst 12 has as its object the purification of $NO_X$ by repeating the storage and release of $NO_X$, and accordingly as shown in FIG. 8(A) and FIG. 8(B), naturally the $NO_X$ purification rate and HC oxidation rate are high.

However, as shown in FIGS. 8(A) and 8(B), the $NO_X$ storing catalyst 12 is made to release a considerable amount of $SO_X$. Of course, this $SO_X$ release action is one performed when the air-fuel ratio of the exhaust gas is made rich. As opposed to this, in the present invention, the basicity of the $SO_X$ trap catalyst 11 is strengthened and the acidity thereof is weakened compared with the $NO_X$ storing catalyst 12 until the $SO_X$ release amount becomes zero when the temperature of the $SO_X$ trap catalyst is the temperature range at the time of ordinary operation, that is, about 150° C. to about 400° C. If the basicity of the $SO_X$ trap catalyst 11 is strengthened and the acidity thereof is weakened compared with the $NO_X$ storing catalyst 12 in this way, the $SO_X$ trap catalyst 11 will absorb $NO_X$, but will no longer be able to release almost any of the absorbed $NO_X$, so as shown in FIG. 8(A), the $NO_X$ purification rate of the $SO_X$ trap catalyst 11 becomes considerably lower.

In this case, when the temperature of the $SO_X$ trap catalyst is in the temperature range at the time of ordinary operation, that is, about 150° C. to about 400° C., if making the basicity of the $SO_X$ trap catalyst 11 stronger and the acidity thereof weaker until the $SO_X$ release rate becomes zero, the $NO_X$ purification rate when using the $SO_X$ trap catalyst 11 becomes about 10 percent or less of the $NO_X$ purification rate when using the $NO_X$ storing catalyst 12. Therefore, the $SO_X$ trap catalyst 11 can be said to be strengthened in basicity and weakened in acidity compared with the $NO_X$ storing catalyst 12 to an extent that when the temperature of the $SO_X$ trap catalyst 11 is in the temperature range at the time of ordinary operation, that is, about 150° C. to about 400° C., the $NO_X$ purification rate by the $SO_X$ trap catalyst 11 becomes about 10 percent or less of the $NO_X$ purification rate by said $NO_X$ storing catalyst 12.

On the other hand, as will be understood from FIG. 8(B), when the temperature of the $SO_X$ trap catalyst is in the temperature range at the time of ordinary operation, that is, about 150° C. to about 400° C., if making the basicity of the $SO_X$ trap catalyst 11 stronger and making the acidity thereof weaker until the $SO_X$ release rate becomes zero, the HC oxidation rate when using the $SO_X$ trap catalyst 11 becomes about 10 percent or less of the HC oxidation rate when using the $NO_X$ storing catalyst 12 at ordinary times. Therefore, the $SO_X$ trap catalyst 11 can be said to be strengthened in basicity and weakened in acidity compared with the $NO_X$ storing catalyst 12 to an extent that when the temperature of the $SO_X$ trap catalyst becomes the temperature range at the time of ordinary operation, that is, about 150° C. to about 400° C., the HC oxidation rate by the $SO_X$ trap catalyst 11 becomes about 10 percent or less of the HC oxidation rate by the $NO_X$ storing catalyst 12.

Note that the smaller the amount of the precious metal catalyst, the weaker the oxidation action of the HC, so in the embodiment according to the present invention, the amount of the precious metal catalyst 52 carried on the $SO_X$ trap catalyst 11 is smaller than the amount of the precious metal catalyst 46 carried on the $NO_X$ storing catalyst 12.

Figure 9:
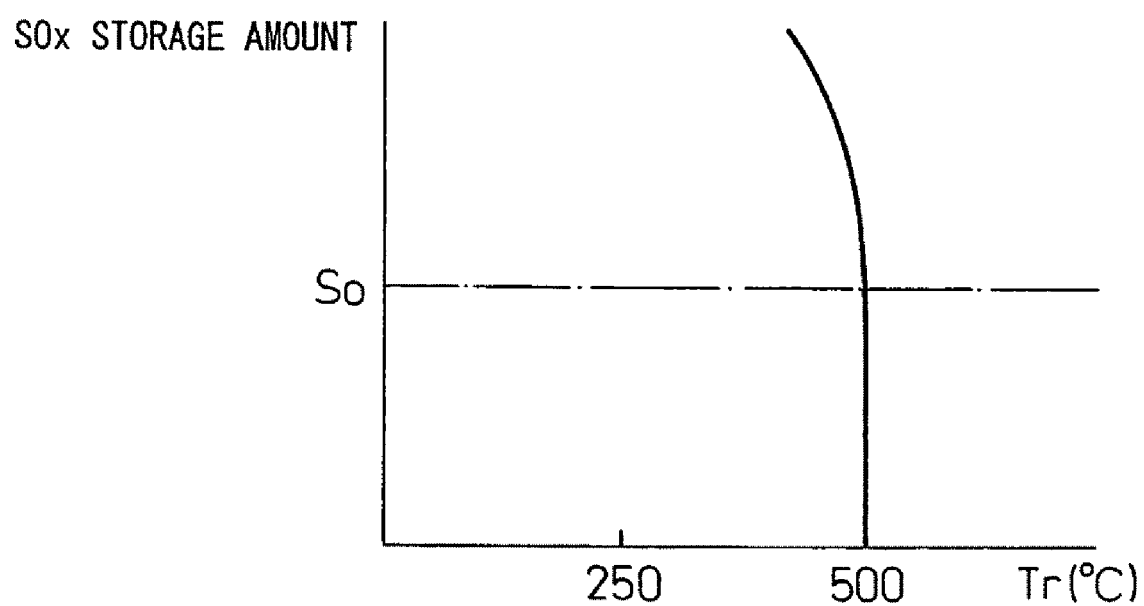
FIG. 9 is a view showing an $SO_X$ release lower limit temperature Tr.

Now, even if strengthening the basicity of the $SO_X$ trap catalyst 11 so that the $NO_X$ purification rate becomes 10 percent or less of the $NO_X$ storing catalyst 12 in this way, if the temperature of the $SO_X$ trap catalyst 11 becomes a high temperature, $SO_X$ is released from the $SO_X$ trap catalyst 11 when the air-fuel ratio of the exhaust gas is made rich so as to make the $NO_X$ storing catalyst 12 release $NO_X$. FIG. 9 shows the lower limit temperature Tr of the $SO_X$ release temperature where the $SO_X$ trap catalyst 11 releases $SO_X$ when the air-fuel ratio of the exhaust gas is made rich so as to make the $NO_X$ storing catalyst 12 release $NO_X$ in this way.

As shown in FIG. 9, this $SO_X$ release lower limit temperature Tr is a function of the amount of $SO_X$ stored in the $SO_X$ trap catalyst 11 and becomes lower the greater the $SO_X$ storage amount. Speaking more specifically, the $SO_X$ release lower limit temperature Tr is a fixed temperature of about 500° C. when the $SO_X$ storage amount is a fixed amount $S_0$ or less. When the $SO_X$ storage amount is a fixed amount $S_0$ or more, the $SO_X$ release lower limit temperature Tr becomes lower the greater the $SO_X$ storage amount.

When the temperature of the $SO_X$ trap catalyst 11 is higher than the $SO_X$ release lower limit temperature Tr, if the air-fuel ratio of the exhaust gas is made rich so as to make the $NO_X$ storing catalyst 12 release $NO_X$, the $SO_X$ trap catalyst 11 releases $SO_X$. Therefore, in the present invention, when the air-fuel ratio of the exhaust gas flowing into the $SO_X$ trap catalyst 11 is switched from lean to rich so as to make the $NO_X$ storing catalyst 12 release $NO_X$, if the temperature of the $SO_X$ trap catalyst 11 is higher than the $SO_X$ release lower limit temperature Tr, rich processing for making the air-fuel ratio of the exhaust gas flowing into the $SO_X$ trap catalyst 11 rich so as to make the $NO_X$ storing catalyst 12 release $NO_X$ is prohibited.

Now, as explained above, in the embodiment according to the present invention, when the $SO_X$ trap rate falls below a predetermined rate, temperature raising control for raising the temperature of the $SO_X$ trap catalyst 11 under a lean air-fuel ratio of the exhaust gas is performed and thereby restore the $SO_X$ trap rate. In this case, in the embodiment according to the present invention, the reducing agent feed valve 14 is made to feed reducing agent and the oxidation reaction of this reducing agent is used to raise the temperature of the $SO_X$ trap catalyst 11.

Note that in the present invention, basically it is considered that the $SO_X$ trap catalyst 11 will be used as it is without replacement from the purchase of the vehicle to its scrapping. In recent years, in particular, the amount of sulfur contained in fuel has been reduced. Therefore, if increasing the capacity of the $SO_X$ trap catalyst 11 to a certain extent, the $SO_X$ trap catalyst 11 can be used without replacement until scrapping. For example, if the durable running distance of the vehicle is 500,000 km, the capacity of the $SO_X$ trap catalyst 11 is made a capacity whereby the $SO_X$ can continue to be trapped by a high $SO_X$ trap rate without temperature raising control until the running distance becomes 250,000 km or so. In this case, the initial temperature raising control is performed when the running distance becomes 250,000 km or so.

Next, referring to FIG. 10 to FIG. 12, a first embodiment of processing for $SO_X$ stabilization in the $SO_X$ trap catalyst 11 will be explained.

In this first embodiment, the $SO_X$ amount trapped by the $SO_X$ trap catalyst 11 is estimated. When the $SO_X$ amount trapped by the $SO_X$ trap catalyst 11 exceeds a predetermined amount, it is determined that the $SO_X$ trap rate has fallen below a predetermined rate. At this time, to restore the $SO_X$ trap rate, temperature raising control for raising the temperature of the $SO_X$ trap catalyst 11 under a lean air-fuel ratio of the exhaust gas is performed.

That is, fuel contains a certain percentage of sulfur. Therefore, the $SO_X$ amount contained in the exhaust gas, that is, the $SO_X$ amount trapped by the $SO_X$ trap catalyst 11, is proportional to the fuel injection amount. The fuel injection amount is a function of the required torque and engine speed, therefore the amount of $SO_X$ trapped at the $SO_X$ trap catalyst 11 also becomes a function of the required torque and engine speed. In the embodiment according to the present invention, the $SO_X$ amount SOXA trapped in the $SO_X$ trap catalyst 11 per unit time is stored as a function of the required torque TQ and engine speed N in the form of the map shown in FIG. 10(A) in advance in the ROM 32.

Further, the lubrication oil contains a certain percentage of sulfur. The amount of lubrication oil burned in a combustion chamber 2, that is, the amount of $SO_X$ contained in the exhaust gas and trapped by the $SO_X$ trap catalyst, also becomes a function of the required torque and engine speed. In the embodiment according to the present invention, the amount SOXB of $SO_X$ contained in the lubrication oil and trapped by the $SO_X$ trap catalyst 11 per unit time is stored as a function of the required torque TQ and engine speed N in the form of the map shown in FIG. 10(B) in advance in the ROM 32. By cumulatively adding the sum of the $SO_X$ amount SOXA and $SO_X$ amount SOXB, the $SO_X$ amount $\Sigma SOX$ trapped by the $SO_X$ trap catalyst 11 is calculated.

Further, in the embodiment according to the present invention, as shown in FIG. 10(C), the relationship between the $SO_X$ amount $\Sigma SOX$ and the predetermined $SO_X$ amount SO(n) when the temperature of the $SO_X$ trap catalyst 11 should be raised is stored in advance. When the $SO_X$ amount $\Sigma SOX$ exceeds the predetermined SO(n) (n=1, 2, 3, ... ), temperature raising control of the $SO_X$ trap catalyst 11 is performed. Note that, in FIG. 10(C), n indicates what number of operation the temperature raising processing is. As will be understood from FIG. 10(C), as the number n of temperature raising processings for restoring the $SO_X$ trap rate increases, the predetermined amount SO(n) is increased. The ratio of increase of this predetermined amount SO(n) is decreased the greater the number n of processings. That is, the ratio of increase of SO(3) to SO(2) is decreased from the ratio of increase of SO(2) to SO(1).

Figure 11:
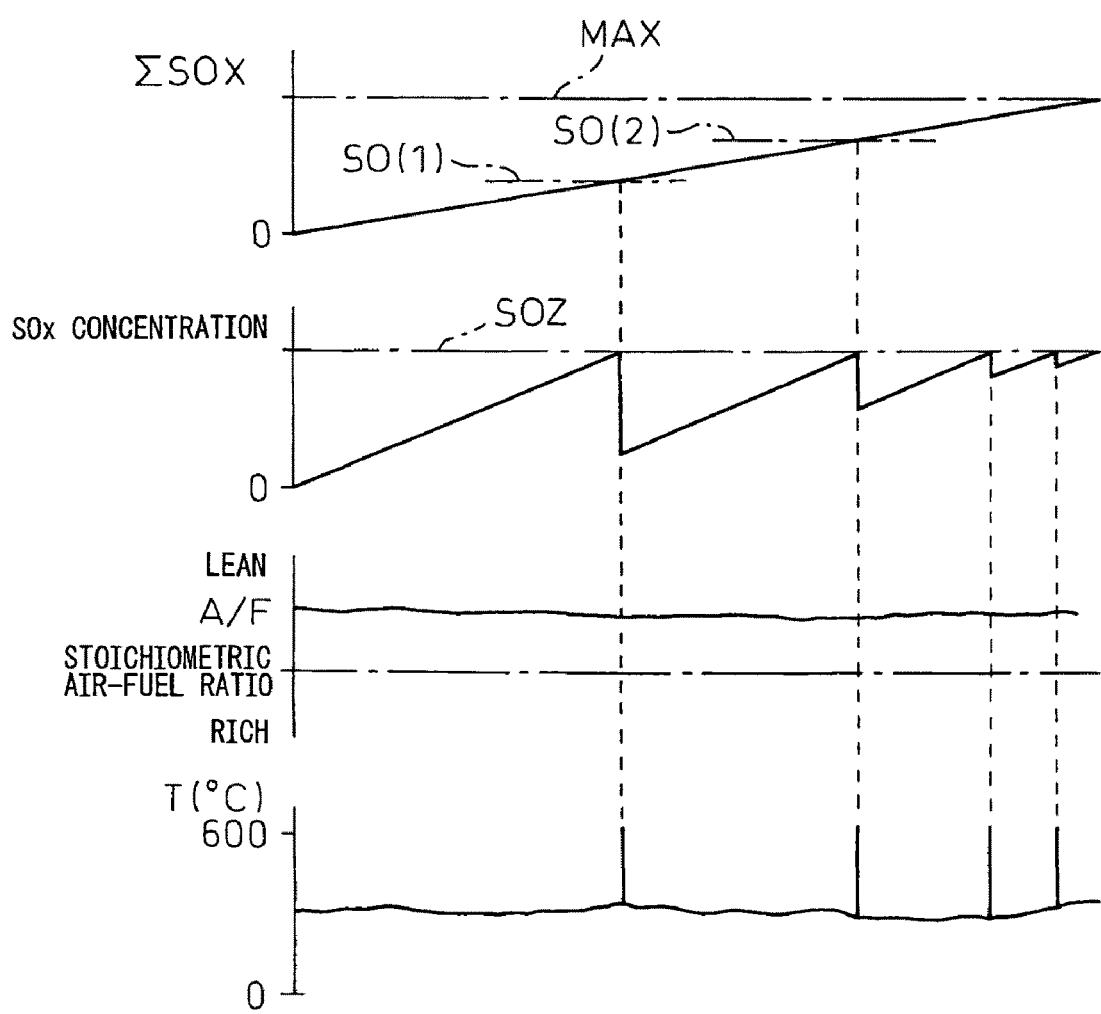
FIG. 11 is a time chart showing the changes in the stored $SO_X$ amount $\Sigma SOX$ etc.

That is, as shown by the time chart of FIG. 11, the $SO_X$ amount $\Sigma SOX$ trapped by the $SO_X$ trap catalyst 11 continues increasing along with the elapse of time until the allowable value MAX. Note that in FIG. 11, when the time when $\Sigma SOX=MAX$ is the time of a running distance of about 500,000 km.

On the other hand, in FIG. 11, the $SO_X$ concentration shows the $SO_X$ concentration near the surface of the $SO_X$ trap catalyst 11. As will be understood from FIG. 11, if the $SO_X$ concentration near the surface of the $SO_X$ trap catalyst 11 exceeds the allowable value SOZ, temperature raising control for raising the temperature T of the $SO_X$ trap catalyst 11 under a lean air-fuel ratio of the exhaust gas A/F is performed. If the temperature raising control is performed, the $SO_X$ concentration near the surface of the $SO_X$ trap catalyst 11 decreases, but the amount of decrease of this $SO_X$ concentration becomes smaller each time the temperature raising control is performed. Therefore, the time from when temperature raising control is performed to when temperature raising control is next performed becomes shorter each time the temperature raising control is performed.

Note that the $SO_X$ amount $\Sigma SOX$ trapped as shown in FIG. 11 reaching SO(1), SO(2), . . . means that the $SO_X$ concentration near the surface of the $SO_X$ trap catalyst 11 has reached the allowable value SOZ.

Figure 12:
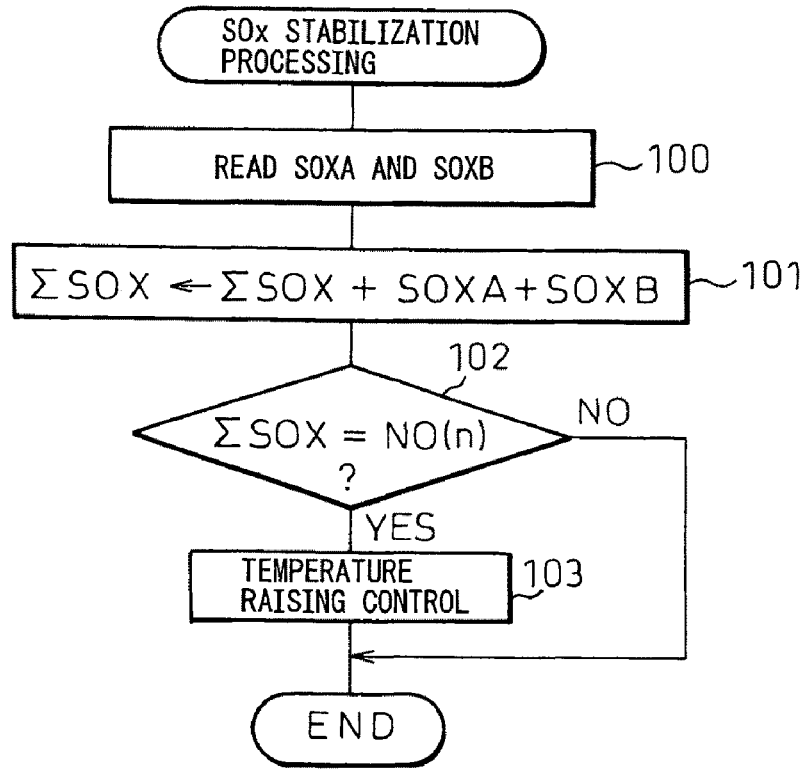
FIG. 12 is a flow chart for carrying out the first embodiment of the $SO_X$ stabilization processing.

FIG. 12 shows the routine for carrying out a first embodiment of processing for stabilization of $SO_X$.

Referring to FIG. 12, first, at step 100, the $SO_X$ amounts SOXA and SOXB trapped per unit time are read from FIGS.

10(A) and (B). Next at step 101, the sum of SOXA and SOXB is added to the $SO_X$ amount $\Sigma SOX$. Next at step 102, it is determined if the $SO_X$ amount $\Sigma SOX$ has reached the predetermined amount SO(n) (n=1, 2, 3, ...) shown in FIG. 10(C). When the $SO_X$ amount $\Sigma SOX$ reaches the predetermined amount SO(n), the routine proceeds to step 103 where temperature raising control is performed.

Figure 13:
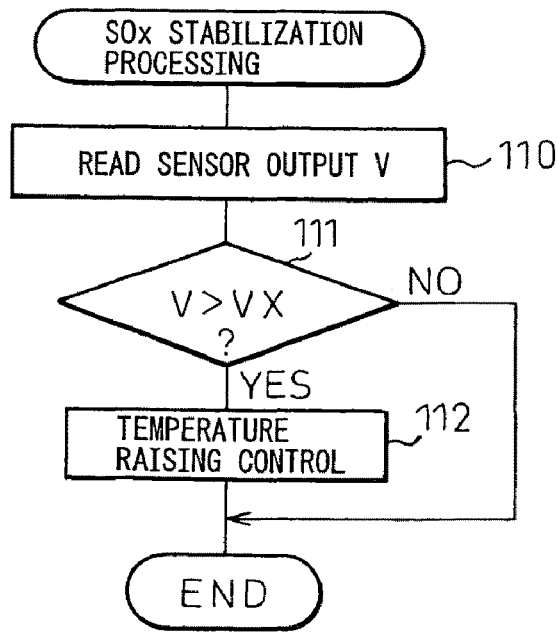
FIG. 13 is a flow chart for carrying out the second embodiment of the $SO_X$ stabilization processing.
Figure 14:
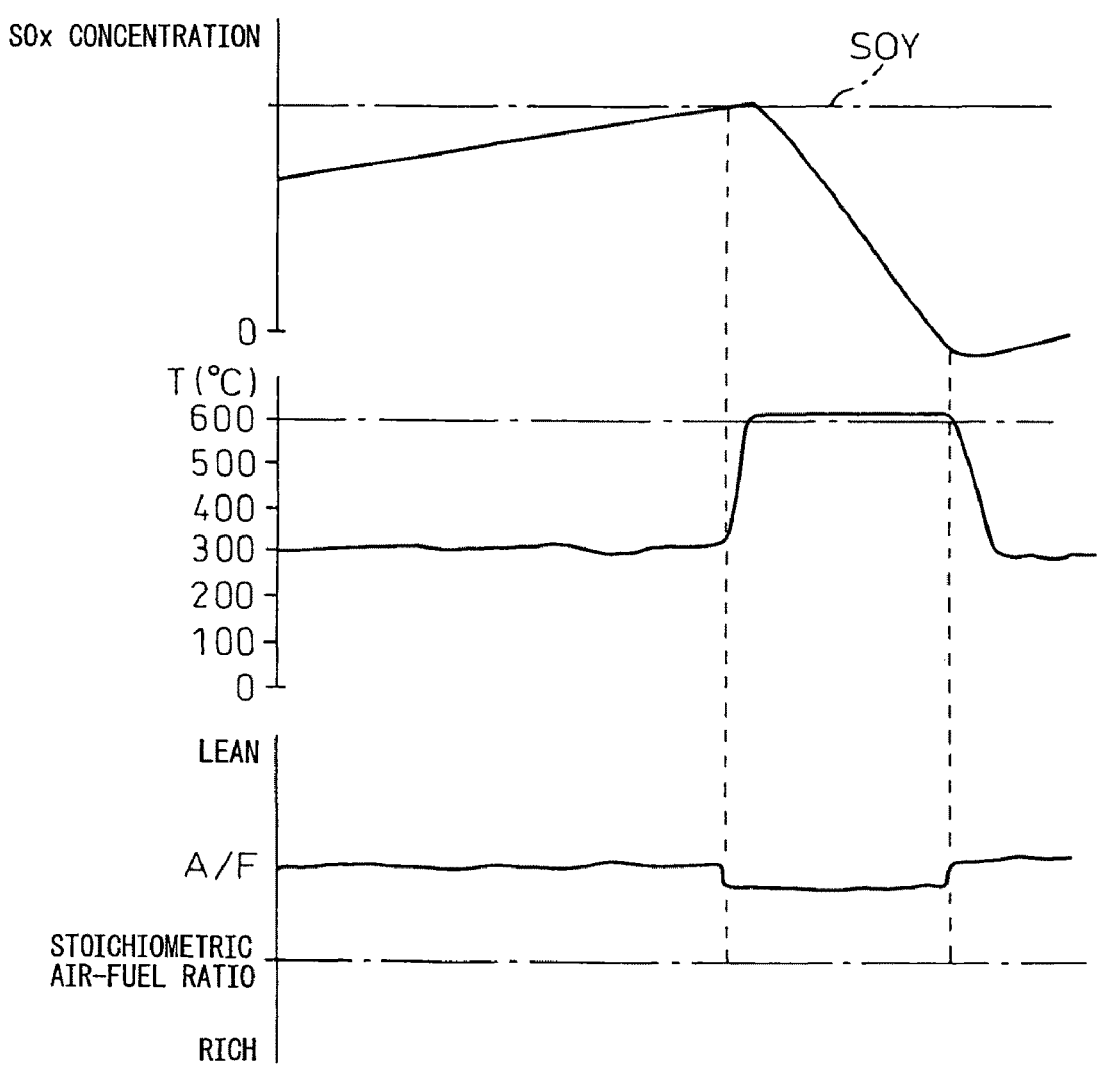
FIG. 14 is a time chart showing the $SO_X$ stabilization processing.

FIG. 13 and FIG. 14 show a second embodiment of $SO_X$ stabilization processing. In this embodiment, as shown in FIG. 2, the $SO_X$ sensor 24 is arranged downstream of the $SO_X$ trap catalyst 11. This $SO_X$ sensor 24 detects the concentration of the $SO_X$ in the exhaust gas flowing out from the $SO_X$ trap catalyst 11. That is, in this second embodiment, as shown in FIG. 14, when the $SO_X$ concentration in the exhaust gas detected by the $SO_X$ sensor 24 exceeds a predetermined concentration SOY, it is determined that the $SO_X$ trap rate has fallen below a predetermined rate. At this time, to restore the $SO_X$ trap rate, temperature raising control for raising the temperature T of the $SO_X$ trap catalyst 11 under a lean air-fuel ratio A/F of the exhaust gas is performed.

FIG. 13 shows the routine for carrying out this second embodiment.

Referring to FIG. 13, first, at step 110, the output signal of the $SO_X$ sensor 24, for example, the power voltage V, is read. Next, at step 111, it is determined if the power voltage V of the $SO_X$ sensor 24 exceeds a setting value VX, that is, if the $SO_X$ concentration in the exhaust gas exceeds a predetermined concentration SOY. When V>VX, that is, when the $SO_X$ concentration in the exhaust gas exceeds a predetermined concentration SOY, the routine proceeds to step 112 where temperature raising control is performed.

Figure 15:
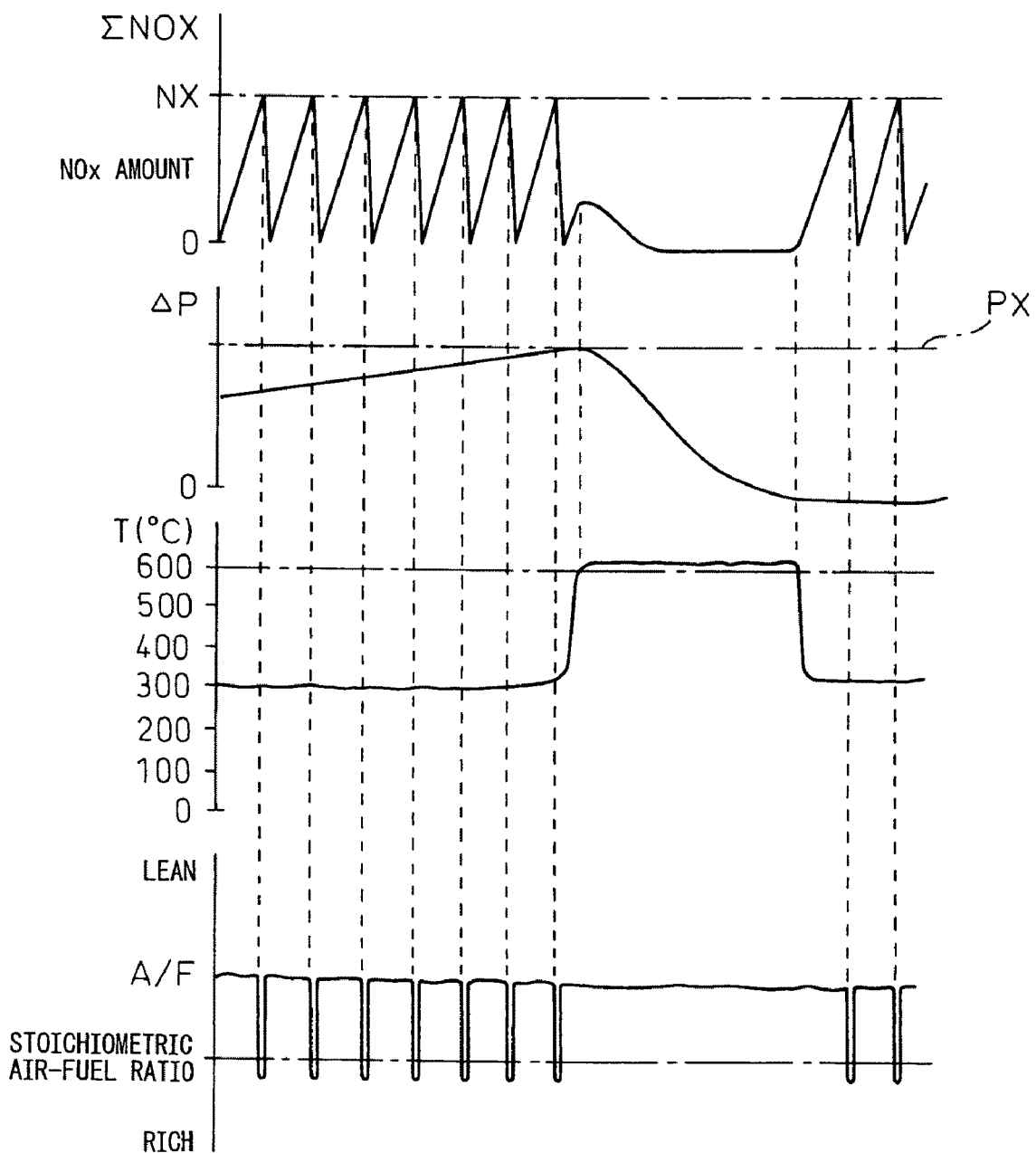
FIG. 15 is a time chart showing temperature raising control of a particulate filter.

Next, referring to FIG. 15 and FIG. 16, the processing of the $NO_X$ storing catalyst 12 will be explained.

Figure 16:
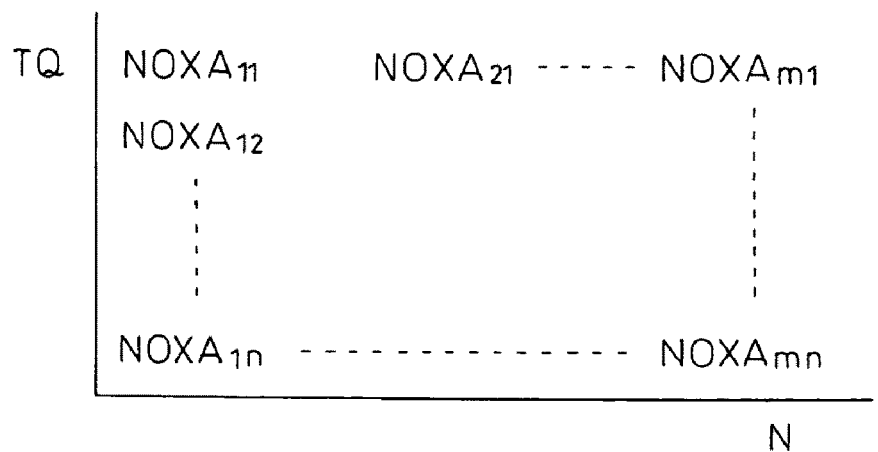
FIG. 16 is a view showing a map of a stored $NO_X$ amount NOXA.

In the embodiment according to the present invention, the $NO_X$ amount NOXA stored in the $NO_X$ storing catalyst 12 per unit time is stored as a function of the required torque TQ and engine speed N in the form of the map shown in FIG. 16 in advance in the ROM 32. By cumulatively adding this $NO_X$ amount NOXA, the $NO_X$ amount $\Sigma NOX$ stored in the $NO_X$ storing catalyst 12 is calculated. In the embodiment according to the present invention, when this $NO_X$ amount $\Sigma NOX$ reaches the allowable value NX, if the temperature of the $SO_X$ trap catalyst 11 is the $SO_X$ release lower limit temperature Tr or less, as shown in FIG. 15, the air-fuel ratio A/F of the exhaust gas flowing into the $NO_X$ storing catalyst 12 is temporarily made rich and thereby the $NO_X$ storing catalyst 12 releases $NO_X$.

On the other hand, the particulate matter contained in exhaust gas is trapped on the particulate filter 12a carrying the $NO_X$ storing catalyst 12 and is successively oxidized. However, if the amount of the deposited particulate matter becomes greater than the amount of oxidized particulate matter, the particulate matter gradually deposits on the particulate filter 12a. In this case, if the amount of deposition of particulate matter increased, a drop in the engine output would end up being invited. Therefore, when the amount of deposition of particulate matter increases, the deposited particulate matter must be removed. In this case, if raising the temperature of the particulate filter 12a under excess air to about 600° C., the deposited particulate matter is oxidized and removed.

Therefore, in the embodiment according to the present invention, when the amount of particulate matter deposited on the particulate filter 12a exceeds an allowable amount, the temperature of the particulate filter 12a is raised under a lean air-fuel ratio of the exhaust gas and thereby the deposited particulate matter is removed by oxidation. Specifically speaking, in the embodiment according to the present invention, when the differential pressure $\Delta P$ before and after the particulate filter 12a detected by the differential pressure sensor 23 exceeds the allowable value PX as shown in FIG. 15, it is determined that the amount of the deposited particulate matter exceeds the allowable amount. At this time, temperature raising control for raising the temperature T of the particulate filter 12a while maintaining the air-fuel ratio of the exhaust gas flowing into the particulate filter 12a lean is performed. Note that if the temperature T of the particulate filter 12a becomes higher, since the $NO_X$ storing catalyst 12 release $NO_X$, the trapped $NO_X$ amount $\Sigma NOX$ is decreased.

Next, the change of the $SO_X$ release lower limit temperature Tr in the case of performing the $SO_X$ stabilization processing shown in FIG. 10 to FIG. 12 will be explained while referring to FIG. 17. Note that FIG. 17 shows again the change in the $SO_X$ amount $\Sigma SOX$ and the change in the $SO_X$ concentration the same as in FIG. 11. In the example shown in FIG. 17, when the $SO_X$ concentration is a fixed concentration SOR or less, the $SO_X$ release lower limit temperature Tr is made a fixed value of about 500° C., while when the $SO_X$ concentration becomes a fixed concentration SOR or more, the $SO_X$ release lower limit temperature Tr becomes lower as the $SO_X$ concentration becomes higher. Note that the relationship between the $SO_X$ amount $\Sigma SOX$ and the $SO_X$ release lower limit temperature Tr shown in FIG. 17 is stored in advance in the ROM 32.

Figure 17:
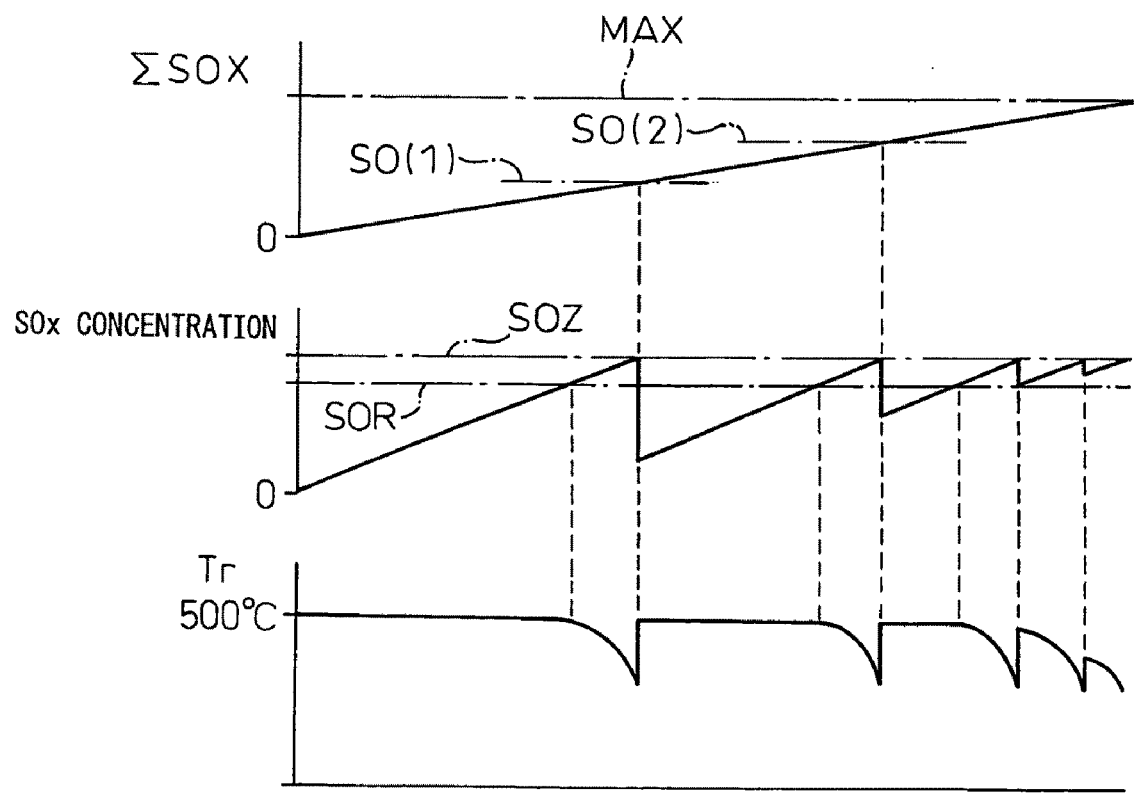
FIG. 17 is a view showing the relationship between the $SO_X$ amount $\Sigma SOX$ and an $SO_X$ release lower limit temperature Tr.
Figure 18:
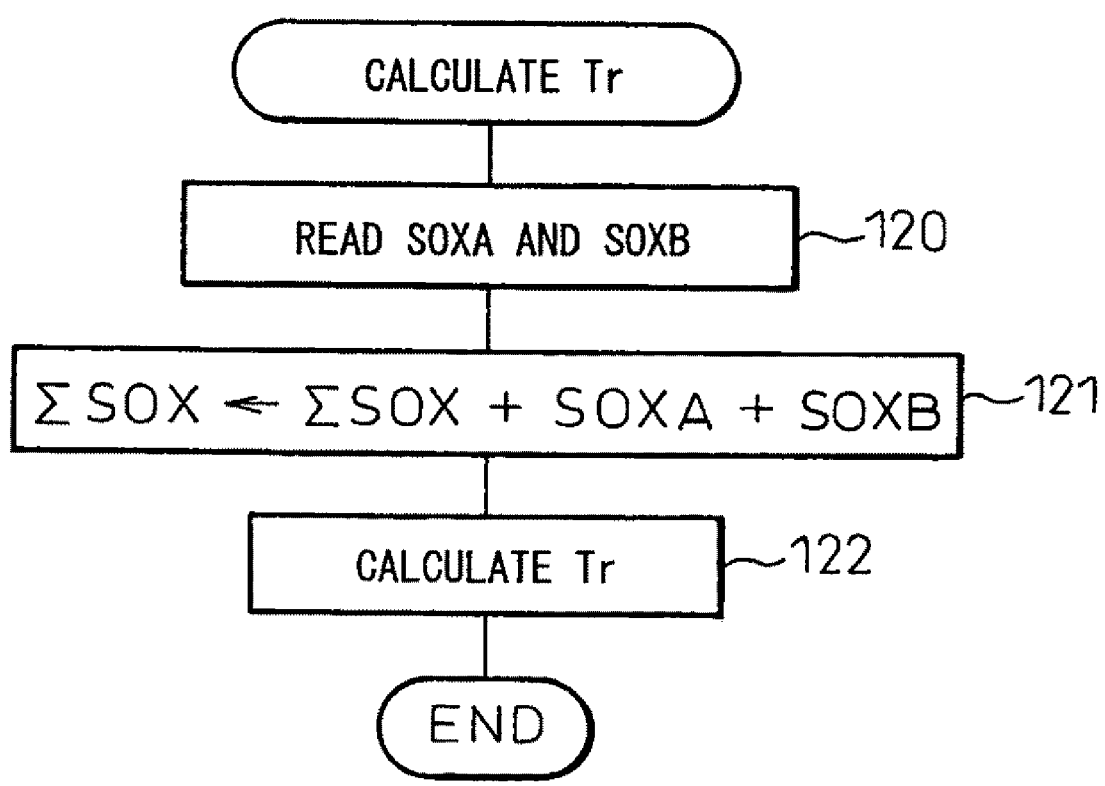
FIG. 18 is a flow chart for calculating an $SO_X$ release lower limit temperature Tr.

FIG. 18 shows the calculation routine of the $SO_X$ release lower limit temperature Tr shown in FIG. 17.

Referring to FIG. 18, first, at step 120, the $SO_X$ amounts SOXA and SOXB trapped per unit time are read from FIGS. 10(A) and (B). Next at step 121, the sum of the SOXA and SOXB is added to the $SO_X$ amount $\Sigma SOX$. Next at step 122, the $SO_X$ release lower limit temperature Tr corresponding to the $SO_X$ amount $\Sigma SOX$ is calculated.

Figure 19:
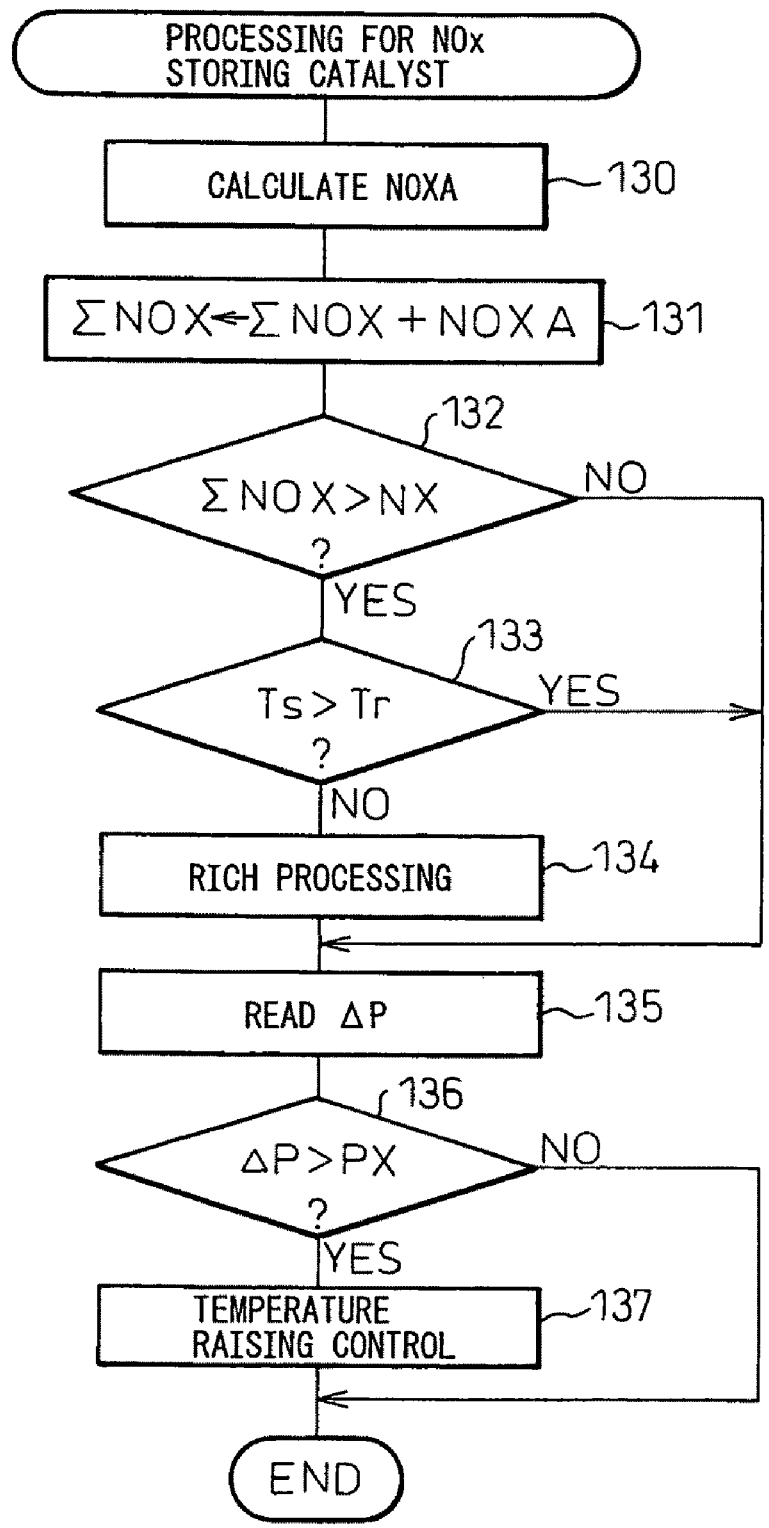
FIG. 19 is a flow chart for carrying out processing on the $NO_X$ storing catalyst.

FIG. 19 shows the processing routine for the $NO_X$ storing catalyst 12.

Referring to FIG. 19, first, at step 130, the $NO_X$ amount NOXA stored per unit time is calculated from the map shown in FIG. 16. Next at step 131, this NOXA is added to the $NO_X$ amount $\Sigma NOX$ stored in the $NO_X$ storing catalyst 12. Next, at step 132, it is determined if the stored $NO_X$ amount $\Sigma NOX$ has exceeded an allowable value NX, while when $\Sigma NOX > NX$, the routine proceeds to step 133 where it is determined if the temperature Ts of the $SO_X$ trap catalyst 11 detected by the temperature sensor 21 is higher than the $SO_X$ release lower limit temperature Tr.

When it is determined at step 133 that Ts≦Tr, the routine proceeds to step 134 where rich processing for temporarily switching the air-fuel ratio of the exhaust gas flowing into the $NO_X$ storing catalyst 12 from lean to rich by the reducing agent supplied from the reducing agent feed valve 14 is performed and $\Sigma NOX$ is cleared. As opposed to this, when it is determined at step 133 that Ts>Tr, the rich processing is not performed and the routine jumps to step 135. That is, at this time, processing for making the air-fuel ratio of the exhaust gas rich for making the $NO_X$ storing catalyst 12 release $NO_X$ is prohibited.

At step 135, the differential pressure $\Delta P$ before and after the particulate filter 12a is detected by the differential pressure sensor 23. Next, at step 136, it is determined if the differential pressure $\Delta P$ exceeds an allowable value PX. When $\Delta P > PX$, the routine proceeds to step 137 where temperature raising control of the particulate filter 12a is performed. This temperature raising control is performed by maintaining the air-fuel ratio of the exhaust gas flowing into the particulate filter 12a lean and supplying reducing agent from the reducing agent feed valve 14.

LIST OF REFERENCE NUMERALS

4 ... intake manifold
5 ... exhaust manifold
7 ... exhaust turbocharger
11 ... $SO_X$ trap catalyst
12 ... $NO_X$ storing catalyst
14 ... reducing agent feed valve

The invention claimed is:

1. An exhaust purification device of a compression ignition type internal combustion engine comprising:
an $SO_X$ trap catalyst, arranged in an engine exhaust passage, for trapping $SO_X$ contained in exhaust gas;
an $NO_X$ storing catalyst, arranged downstream from the $SO_X$ trap catalyst, wherein
the $NO_X$ storing catalyst stores $NO_X$ contained in the exhaust gas when an air-fuel ratio of the exhaust gas is lean and releases stored $NO_X$ when the air-fuel ratio of the exhaust gas becomes a stoichiometric air-fuel ratio or rich,
the air-fuel ratio of the exhaust gas flowing into the $SO_X$ trap catalyst is switched from lean to rich so as to make the $NO_X$ storing catalyst release $NO_X$,
the exhaust purification device prohibits switching the air-fuel ratio of the exhaust gas from lean to rich if the temperature of the $SO_X$ trap catalyst is higher than an $SO_X$ release lower limit temperature for releasing $SO_X$, and
the $SO_X$ release lower limit temperature is a function of the $SO_X$ storage amount stored in the $SO_X$ trap catalyst.

2. An exhaust purification device of a compression ignition type internal combustion engine as set forth in claim 1, wherein said $SO_X$ release lower limit temperature becomes lower the higher the $SO_X$ storage amount stored in the $SO_X$ trap catalyst.

3. An exhaust purification device of a compression ignition type internal combustion engine as set forth in claim 1, wherein said $SO_X$ release lower limit temperature becomes lower the higher an $SO_X$ concentration near a surface of a coat layer of the $SO_X$ trap catalyst.

4. An exhaust purification device of a compression ignition type internal combustion engine as set forth in claim 1, wherein said $SO_X$ trap catalyst is strengthened in basicity and is weakened in acidity compared with said $NO_X$ storing catalyst to an extent that when the temperature of said $SO_X$ trap catalyst is about 150° C. to about 400° C., the $NO_X$ purification rate by the $SO_X$ trap catalyst becomes about 10 percent or less of the $NO_X$ purification rate by said $NO_X$ storing catalyst.

5. An exhaust purification device of a compression ignition type internal combustion engine as set forth in claim 4, wherein said $SO_X$ trap catalyst is strengthened in basicity and is weakened in acidity compared with said $NO_X$ storing catalyst to an extent that when the temperature of said $SO_X$ trap catalyst is about 150° C. to about 400° C., the HC oxidation rate also becomes about 10 percent or less of the HC oxidation rate by said $NO_X$ storing catalyst.

6. An exhaust purification device of a compression ignition type internal combustion engine as set forth in claim 1, wherein said $SO_X$ trap catalyst is comprised of a coat layer formed on a catalyst carrier and a precious metal catalyst carried on the coat layer, the coat layer contains an alkali metal, alkali earth, or rare earth metal diffused therein, and said $NO_X$ storing catalyst carries on a catalyst carrier an $NO_X$ adsorbent selected from an alkali metal, alkali earth, or rare earth metal and a precious metal catalyst.

7. An exhaust purification device of a compression ignition type internal combustion engine as set forth in claim 6, wherein the precious metal catalyst amount carried on said $SO_X$ trap catalyst is smaller than the precious metal catalyst amount carried on said $NO_X$ storing catalyst.

8. An exhaust purification device of a compression ignition type internal combustion engine as set forth in claim 1, wherein a reducing agent feed device is arranged in the exhaust passage upstream of the $SO_X$ trap catalyst and, when the $NO_X$ storing catalyst should release $NO_X$, the reducing agent feed device supplies reducing agent in the exhaust passage to make the air-fuel ratio of the exhaust gas flowing into the $NO_X$ storing catalyst temporarily rich.

9. An exhaust purification device of a compression ignition type internal combustion engine as set forth in claim 1, wherein said $SO_X$ trap catalyst has a property of making trapped $SO_X$ gradually diffuse inside the $SO_X$ trap catalyst when the temperature of the $SO_X$ trap catalyst rises under a lean air-fuel ratio of the exhaust gas flowing into the $SO_X$ trap catalyst, said device is provided with estimating means for estimating an $SO_X$ trap rate showing a ratio of the $SO_X$ trapped by the $SO_X$ trap catalyst to the $SO_X$ contained in the exhaust gas, and, when the $SO_X$ trap rate falls below a predetermined rate, the temperature of the $SO_X$ trap catalyst is raised under a lean air-fuel ratio of the exhaust gas and thereby the $SO_X$ trap rate is restored.

10. An exhaust purification device of a compression ignition type internal combustion engine as set forth in claim 9, wherein the $SO_X$ amount trapped by said $SO_X$ trap catalyst is estimated, it is determined that the $SO_X$ trap rate has fallen below a predetermined rate when the $SO_X$ amount trapped by the $SO_X$ trap catalyst exceeds a predetermined amount, and, at this time, the $SO_X$ trap rate is restored by raising the temperature of the $SO_X$ trap catalyst under a lean air-fuel ratio of the exhaust gas.

11. An exhaust purification device of a compression ignition type internal combustion engine as set forth in claim 10, wherein as the number of processings for restoring the $SO_X$ trap rate is increased, said predetermined amount is increased and the ratio of increase of this predetermined amount between successive processings is decreased the greater the number of processings.

12. An exhaust purification device of a compression ignition type internal combustion engine as set forth in claim 10, wherein an $SO_X$ sensor able to detect the $SO_X$ concentration in the exhaust gas is arranged in the exhaust passage downstream of the $SO_X$ trap catalyst and the $SO_X$ trap rate is calculated from an output signal of the $SO_X$ sensor.

13. An exhaust purification device of a compression ignition type internal combustion engine as set forth in claim 9, wherein when the $SO_X$ concentration in the exhaust gas detected by the $SO_X$ sensor exceeds a predetermined concentration, it is determined that the $SO_X$ trap rate has fallen below a predetermined rate and, at this time, to restore the $SO_X$ trap rate, the temperature of the $SO_X$ trap catalyst is raised under a lean air-fuel ratio of the exhaust gas.

14. An exhaust purification device of a compression ignition type internal combustion engine as set forth in claim 1, wherein said $NO_X$ storing catalyst is carried on a particulate filter for trapping and oxidizing particulate matter contained in the exhaust gas.

15. An exhaust purification device of a compression ignition type internal combustion engine as set forth in claim 14, wherein when the amount of particulate matter deposited on the particulate filter exceeds an allowable amount, the temperature of the particulate filter is raised under a lean air-fuel ratio of the exhaust gas and thereby the deposited particulate matter is removed by oxidation.

* * * * *